United States Patent [19]

Malecha

[11] 4,067,195

[45] Jan. 10, 1978

[54] FLUID-BORNE NOISE-SUPPRESSOR FOR HYDRAULIC PUMP

[75] Inventor: Richard J. Malecha, Cleveland, Ohio

[73] Assignee: Caterpillar Tractor Co., Peoria, Ill.

[21] Appl. No.: 633,753

[22] Filed: Nov. 20, 1975

[51] Int. Cl.$^2$ .......................... F16D 3/12; F04B 39/00

[52] U.S. Cl. ........................................ 60/469; 417/313

[58] Field of Search ................ 417/313, 540; 137/207; 60/456, 469; 138/26

[56] References Cited

U.S. PATENT DOCUMENTS

| | | | |
|---|---|---|---|
| 1,490,291 | 4/1924 | Ross | 137/207 |
| 2,341,985 | 2/1944 | Green | 60/456 |
| 2,490,493 | 12/1949 | Wade | 417/540 |
| 2,630,833 | 3/1953 | Ragsdale | 138/26 |
| 3,134,611 | 5/1964 | Iversen | 60/469 |
| 3,150,689 | 9/1964 | Lieberman | 138/26 |
| 3,565,338 | 2/1971 | Wright | 137/207 |
| 3,660,979 | 5/1972 | Kamakura | 60/469 |

FOREIGN PATENT DOCUMENTS

| | | | |
|---|---|---|---|
| 1,042,770 | 6/1963 | United Kingdom | 137/207 |

*Primary Examiner*—William L. Freeh
*Attorney, Agent, or Firm*—Phillips, Moore, Weissenberger, Lempio & Majestic

[57] ABSTRACT

A noise-suppressor for fluid-borne noises in a hydraulic system comprises a cylindrical shaped housing consisting of a pair of cup-shaped end caps and a tubular center section connected therebetween such that the joint between the section and end caps is spaced from the end of the housing. The housing includes fins on the outer surface for radiating heat therefrom. An inertance tube is disposed within the housing coaxially thereof and communicating directly with the outlet thereof which in turn is coaxial with an inlet thereto.

5 Claims, 2 Drawing Figures

FLUID-BORNE NOISE-SUPPRESSOR FOR HYDRAULIC PUMP

BACKGROUND OF THE INVENTION

The present invention relates to noise-suppressors and pertains particularly to noise-suppressors for noises transmitted through fluid in hydraulic systems.

The health hazards associated with high noise levels is well known. Such noise levels become more of a problem or an increasing problem with higher speed and larger machines. Larger, higher-velocity and higher-pressure hydraulic systems lead to higher noise levels.

There are numerous noises associated with such machines. Such noises may be structural or component noises and may radiate through the structure of the machine or through the fluid itself. The prior art approach to solution of some of these problems is known, for example, in the following publications: "Can You Hear the Hydraulic System?" by J. S. Noss, published Sept. 17, 1970 in Machine Design; and "Silencing the Noisy Hydraulic System", published June 14, 1973 in Machine Design.

The present invention is directed to the problem of fluid-borne noises. Such noises may, for example, be generated by the pump of the system, especially when such pump is a positive-displacement pump and such noises may be transmitted through the fluid itself, and amplified by a rigid mounted valve.

SUMMARY AND OBJECTS OF THE INVENTION

It is the primary object of the present invention to overcome the above problems of the prior art.

Another object of the present invention is to provide a novel and efficient acoustical filter for reducing noise transmitted through fluids in a hydraulic system.

A further object of the present invention is to provide a simple, inexpensive and structurally rigid noise-suppressor for noise transmitted through the fluid of a hydraulic system.

A still further object of the present invention is to provide a combined fluid noise-suppressor and fluid cooler for hydraulic fluid systems.

In accordance with the primary aspects of the present invention, a noise-suppressor for a fluid system comprises a fluid chamber through which the fluid of the system passes axially, which fluid chamber is comprised of a cylindrical housing comprising a pair of cup-shaped end caps joined together by a tubular center section such that the connection of the end caps to the center section is based from the ends of the cylinder.

BRIEF DESCRIPTION OF THE DRAWING

The above and other objects and advantages of the present invention will become apparent from the following description when read in conjunction with the drawings wherein.

DETAILED DESCRIPTION OF A PREFERRED EMBODIMENT

Figure 1:
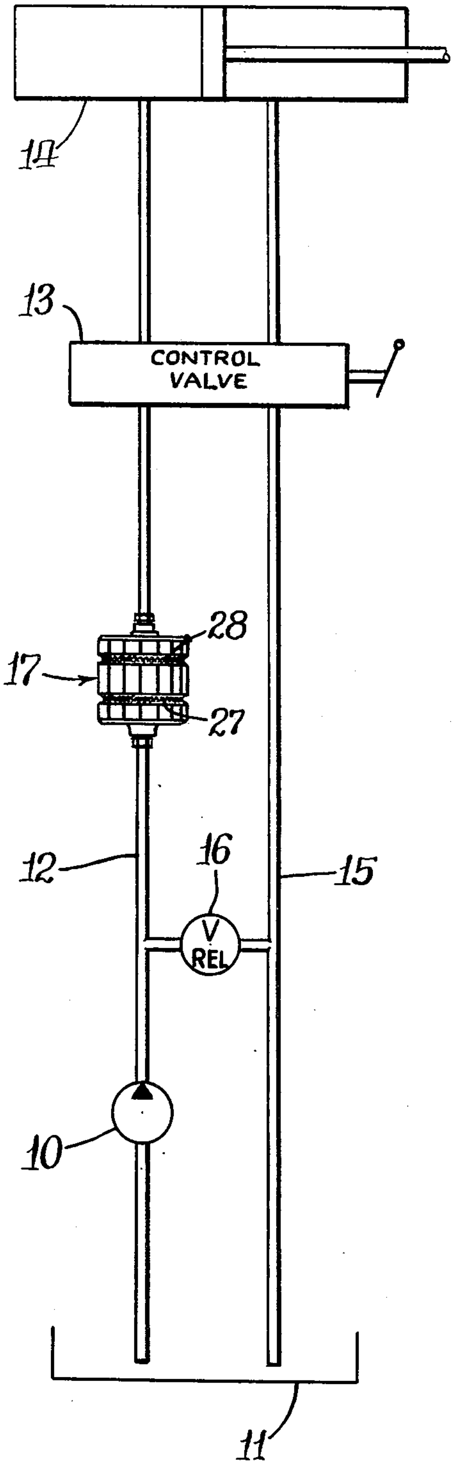
FIG. 1 is a schematic layout of a hydraulic system embodying the present invention; and, FIG. 2 is a sectional view of a preferred embodiment of the present invention.
Figure 2:
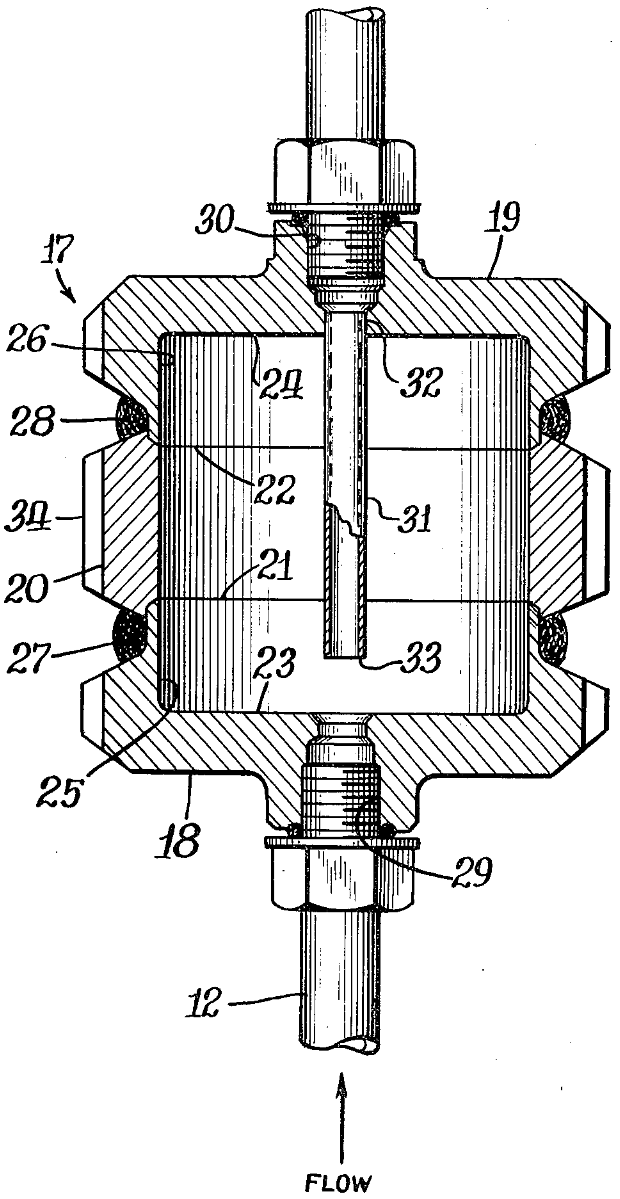

Turning now to the drawings, particularly FIG. 1, there is illustrated a hydraulic system comprising a positive displacement 10 drawing fluid from a reservoir 11 and supplying it by way of a supply line 12 to a control valve 13 which supplies fluid for controlling a double-acting hydraulic motor 14. A return line 15 returns fluid from the valve 13 to the tank 11. A relief valve 16 is provided to protect the system against pressures above a predetermined maximum.

A noise-suppressor 17 in accordance with the present invention is placed in the supply line 12 between the pump and the control valve 13. The noise-suppressor is preferably located between the pump and the control valve because the noise is usually generated at the pump. This noise is often amplified by rigid mounting of the valve to a metal surface in the operator's area providing an efficient noise radiator in close proximity to the operator's ear. The major source of the noise in such instance is the pump itself and the engine driving the pump. With this location of the noise-suppressor, fluid borne noise, otherwise transmitted to the valve where it may be amplified, is reduced considerably before it gets to the location of the valve 13 where the operator of the machine is located.

The noise suppressor itself comprises a pair of end caps 18 and 19, each having a generally cup-shaped configuration connected together by a central tubular section 20. The tubular center section may be one or more of the tubular elements of substantially the same length. Thus, any number of the tubular elements 20 may be added to lengthen the assembly if desired.

The respective end caps 18 and 19 are connected to the central section 20 at spaced joints 21 and 22 which are spaced from the ends of the caps 18 and 19. The caps 18 and 19 each respectively include an end wall 23 and 24 and outwardly extending cylindrical side walls 25 and 26. These end caps are of a unitary construction so that no joint exists between the end walls 23 and the side walls 25 and 26. This eliminates a high concentration of stress at a normal joint at this junction. With this arrangement, the joints 21 and 22 are in tension stress and not in shear stress. This is an important consideration since the system is a high-pressure, high-velocity system with resultant surges in pressure within the chamber defined by the suppressor 17. The joints at 21 and 22 may be any suitable fabrication but are preferably welded such as at 27 and 28.

The housing of the suppressor 17 comprises an inlet 29 in one end 18 coaxial with the bore of the housing and an outlet 30 in the other end 19 also coaxial therewith. An inertance tube 31 includes one end 32 communicating directly with the outlet 30 and another end 33 spaced from but coaxial with the inlet 29.

The noise-suppressor in this case is also designed to serve as a cooler for the oil of the system. In this connection the suppressor housing of the suppressor 18 is provided with a series of cooling fins 34 extending radially outwardly and longitudinally of the housing. These fins radiate the heat from the housing which the housing picks up from the oil flowing therethrough. Thus, the apparatus serves as both noise-suppressor and cooling means for the oil of the hydraulic system.

While the present invention has been described and illustrated by means of a specific embodiment, it is to be understood that numerous changes and modifications may be made therein without departing from the spirit and scope of the invention as defined in the appended claims.

What is claimed is:

1. A segmented noise-suppressor for fluid-borne noises in hydraulic systems, comprising:
  - a pair of first segments including cup-shaped unitary end caps, each having a flat end and a tubular wall extending therefrom;
  - at least one second segment including one tubular center section joining said end caps at joints spaced from the flat ends thereof by said tubular walls thereof for defining an enlarged chamber with said caps at the ends thereof and aligned coaxially with one another;
  - one of said caps having means defining an inlet coaxial thereof;
  - the other of said caps having an outlet coaxial thereof and

- an internal inertence tube coaxial with said inlet and said outlet and communicating with said outlet.

2. A noise-suppressor as in claim 1, wherein said internal inertence tube extends from said outlet substantially linearly towards said inlet.

3. The noise suppressor of claim 2 including a plurality of radially extending fins extending axially along the outer surface of said tubular housing for radiating heat from said housing for thereby cooling the fluid flowing therein.

4. The noise-suppressor of claim 3 wherein said suppressor is disposed in a hydraulic system between a pump which comprises a major source of noise in said system and a directional control valve.

5. The noise-suppressor of claim 4 wherein said pump is a positive displacement pump.

* * * * *

UNITED STATES PATENT OFFICE
CERTIFICATE OF CORRECTION

Patent No. 4,067,195 Dated January 10, 1978

Inventor(s) RICHARD J. MALECHA

It is certified that error appears in the above-identified patent and that said Letters Patent are hereby corrected as shown below:

Assignee shown as "Caterpillar Tractor Co.,
Peoria, Ill.

should be

"Towmotor Corporation,
Mentor, Ohio"

Signed and Sealed this

***Twenty-third* Day of *May 1978***

[SEAL]

*Attest:*

RUTH C. MASON
*Attesting Officer*

LUTRELLE F. PARKER
*Acting Commissioner of Patents and Trademarks*